(12) United States Patent
Lewis et al.

(10) Patent No.: US 9,914,399 B2
(45) Date of Patent: Mar. 13, 2018

(54) CARGO MANAGEMENT SYSTEM AND MULTIFUNCTION HOOK ASSEMBLY

(71) Applicant: FORD GLOBAL TECHNOLOGIES, LLC, Dearborn, MI (US)

(72) Inventors: Thomas Matthew Lewis, Royal Oak, MI (US); Eileen Franko, Saline, MI (US); Salvatore Joseph Moceri, Rochester Hills, MI (US); George Anthony Hyde, Westland, MI (US); Tariq Ismail, Dearborn, MI (US); Anna Elizabeth Hill, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/937,556

(22) Filed: Nov. 10, 2015

(65) Prior Publication Data

US 2017/0129412 A1    May 11, 2017

(51) Int. Cl.
*B60R 7/08* (2006.01)
*B60R 5/04* (2006.01)

(52) U.S. Cl.
CPC . *B60R 7/08* (2013.01); *B60R 5/04* (2013.01)

(58) Field of Classification Search
CPC .................................... B60R 7/08; B60R 5/04
See application file for complete search history.

(56) References Cited

U.S. PATENT DOCUMENTS

| 6,457,690 B1 | 10/2002 | Spykerman et al. |
| 6,663,067 B2 | 12/2003 | Gordon |
| 7,644,972 B2 | 1/2010 | Lim |

FOREIGN PATENT DOCUMENTS

| CN | 1281439 C | 10/2006 |
| EP | 1810885 A1 | 7/2007 |
| EP | 2617603 B1 | 3/2015 |
| FR | 2877624 A1 | 5/2006 |
| JP | 5265269 B2 | 8/2013 |
| KR | 100968035 B1 * | 7/2010 |
| WO | 2009112280 A2 | 9/2009 |

OTHER PUBLICATIONS

English machine translation of CN1281439C.
English machine translation of EP1810885A1.
English machine translation of FR2877624A1.
English machine translation of JP5265269B2.
English machine translation of WO2009112280A2.

* cited by examiner

*Primary Examiner* — D Glenn Dayoan
*Assistant Examiner* — Melissa A Black
(74) *Attorney, Agent, or Firm* — Vichit Chea; King & Schickli, PLLC (57) ABSTRACT

A multifunction hook assembly is provided for a motor vehicle. That multifunction hook assembly includes a housing having a recess and first and second pivoting hooks carried on the housing. The two pivoting hooks are displaceable between stowed positions received within the recess and deployed positions projecting from the recess. An improved cargo management system is also provided. That improved cargo management system incorporates the multifunction hook assembly.

18 Claims, 8 Drawing Sheets

CARGO MANAGEMENT SYSTEM AND MULTIFUNCTION HOOK ASSEMBLY

TECHNICAL FIELD

This document relates generally to the motor vehicle equipment field and, more particularly, to a multifunction hook assembly including two hooks for different purposes/functions and to a cargo management system incorporating such a multifunction hook assembly.

BACKGROUND

Disclosed herein is a unique multifunction hook assembly and a cargo management system incorporating such an assembly. The multifunction hook assembly includes two separate hooks that may be displaced between stowed positions and deployed positions. The two hooks are uniquely adapted to perform two separate cargo management functions. When deployed, the first hook supports a folding shelf or partition provided in the cargo area of the motor vehicle, such as behind the rear seat in a crossover utility vehicle (CUV) or a sport utility vehicle (SUV). In contrast, when the second hook is deployed it is uniquely designed to function as a bag holder for holding shopping bags such as grocery bags and the like and preventing those bags from rolling around in the storage area of the motor vehicle during motor vehicle operation. Advantageously either or both hooks may be deployed as desired. Further both may be stowed within a recess flush with the side walls of the cargo area when not needed so as to provide a more aesthetically pleasing appearance and keep the hooks out of the way when loading or unloading items into the storage area. Thus it should be appreciated that the multifunction hook assembly and any cargo management system incorporating the multifunction hook assembly provide a number of benefits and advantages.

SUMMARY

In accordance with the purposes and benefits described herein, a multifunction hook assembly is provided for a motor vehicle. That multifunction hook assembly comprises a housing including a recess as well as first and second pivoting hooks carried on the housing. Both the first pivoting hook and the second pivoting hook are displaceable between stowed positions received within the recess in the housing and deployed positions projecting from the recess into a storage area of the motor vehicle.

In one possible embodiment the multifunction hook assembly includes a first pivot connecting the first pivoting hook to the housing. Further that first pivoting hook may include a cavity and the second pivoting hook may be received within that cavity when in the stowed position. In one particularly useful embodiment, a second pivot connects the second pivoting hook to the first pivoting hook.

In one possible embodiment, the multifunction hook assembly also includes a trim face having an opening outlining the recess in the housing.

In one possible embodiment, the first hook includes a first set of opposed pivot pins connecting the first pivoting hook to the housing. Further the first hook includes two hook segments separated by a notch. Those two hook segments may be aligned.

In one possible embodiment the second hook includes a second set of opposed pivot pins connecting the second pivoting hook to the first pivoting hook.

Still further, in one possible embodiment, the housing includes an integral stop in the recess for holding the first pivoting hook flush with the trim face when the first pivoting hook is in the stowed position.

In accordance with an additional aspect, a cargo management system is provided for a motor vehicle. That cargo management system includes a folding shelf and the improvement comprises the multifunction hook assembly described in this document.

In the following description, there are shown and described several preferred embodiments of the multifunction hook assembly and the cargo management system. As it should be realized, the multifunction hook assembly and cargo management system are capable of other, different embodiments and their several details are capable of modification in various, obvious aspects all without departing from the hook assembly and cargo management system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the multifunction hook assembly as well as the improved cargo management system and together with the description serve to explain certain principles thereof. In the drawing figures.

Reference will now be made in detail to the present preferred embodiments of the multifunction hook assembly and the improved cargo management system, examples of which are illustrated in the accompanying drawing figures.

DETAILED DESCRIPTION

Figure 1:
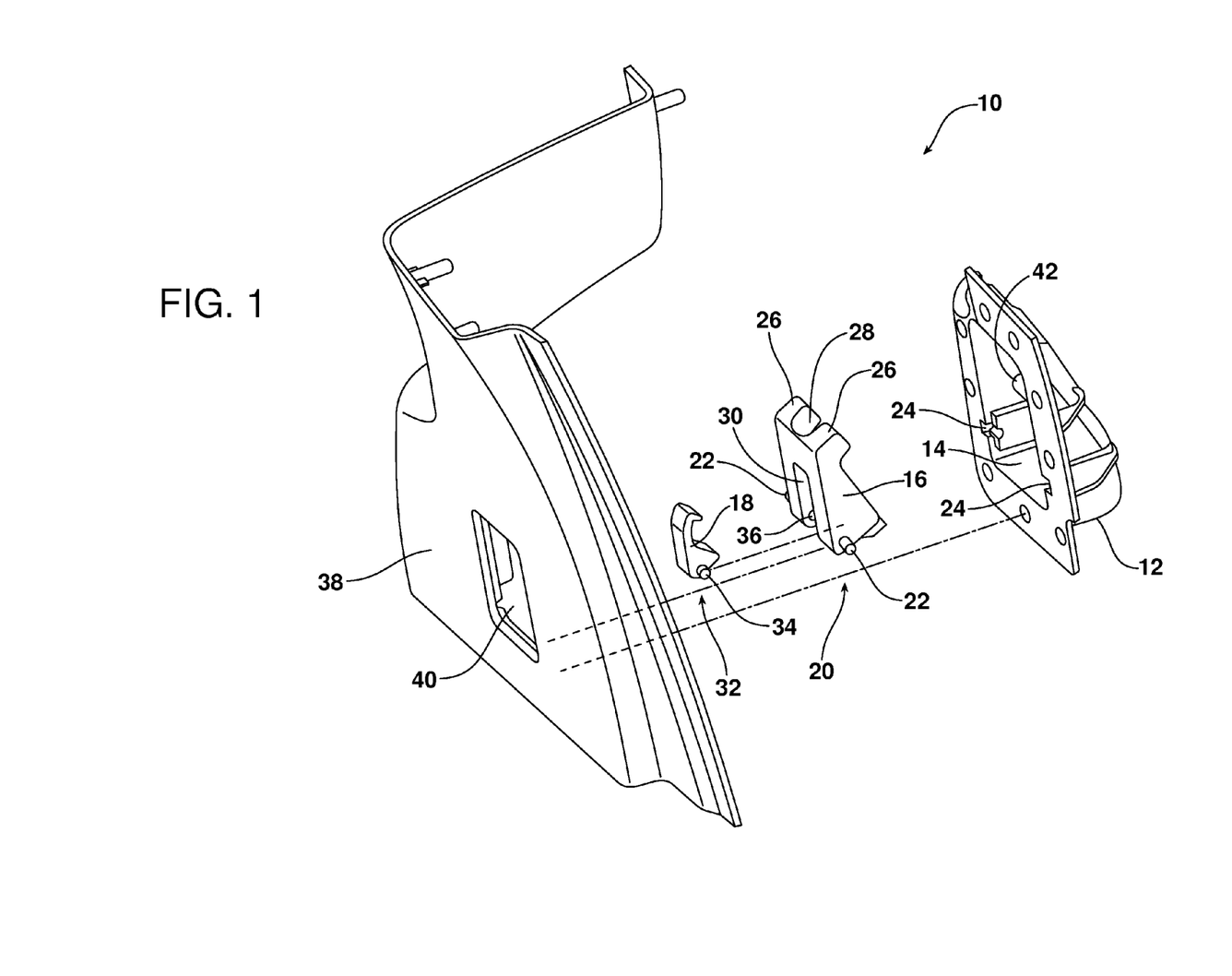
FIG. 1 is a front exploded perspective view of the multifunction hook assembly.
Figure 2:
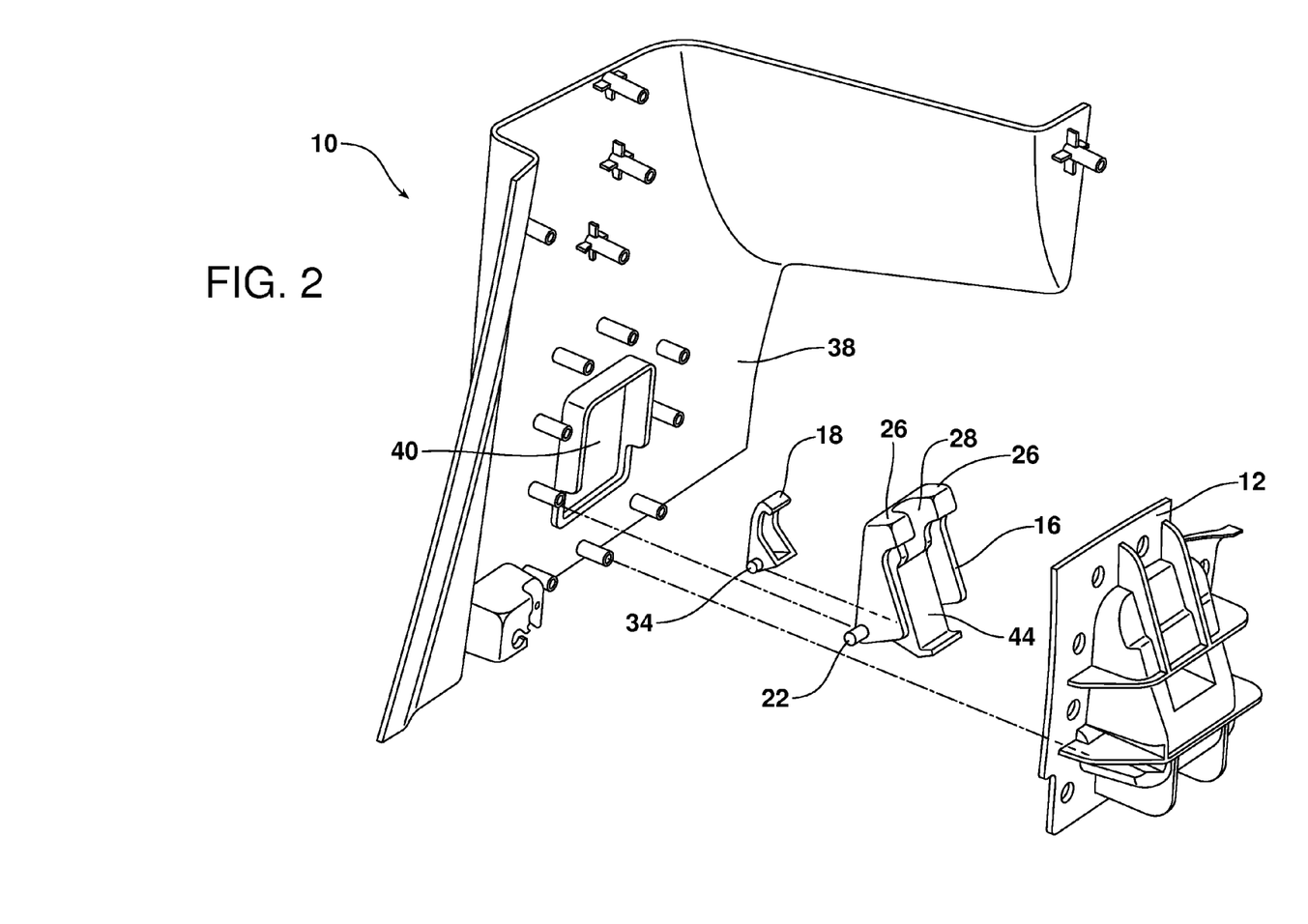
FIG. 2 is a rear exploded perspective view of the multifunction hook assembly shown in FIG. 1.

Reference is now made to FIGS. 1 and 2 illustrating the multifunction hook assembly 10. Such a multifunction hook assembly 10 is particularly useful for motor vehicle applications.

As illustrated, the multifunction hook assembly 10 includes a housing 12 having a recess 14. A first pivoting hook 16 and a second pivoting hook 18 are carried on the housing 12.

More specifically, the first pivoting hook 16 includes a first pivot 20 that connects the first pivoting hook 16 to the housing 12. In the illustrated embodiment, the pivot 20 comprises a first set of opposed pivot pins 22 that are received in opposed pivot pin receivers 24 in the housing 12.

As further illustrated in FIGS. 1 and 2, the first pivoting hook 16 includes two hook segments 26 separated by a notch 28. In the illustrated embodiment, the two hook segments 26 are aligned. The function of the notch 28 will be described in detail below.

The first pivoting hook 16 also includes a cavity 30. The second pivoting hook 18 includes a second pivot 32 that connects the second pivoting hook to the first pivoting hook 16. In the illustrated embodiment, the second pivot 32 comprises a second set of opposed pivot pins 34 that are received and held in a second set of pivot pin receivers 36 provided in the side walls of the cavity 30.

As also illustrated in FIGS. 1 and 2, the multifunction hook assembly 10 also includes a trim face 38 having an opening 40 that overlies the recess 14 in the housing 12.

Figure 3:
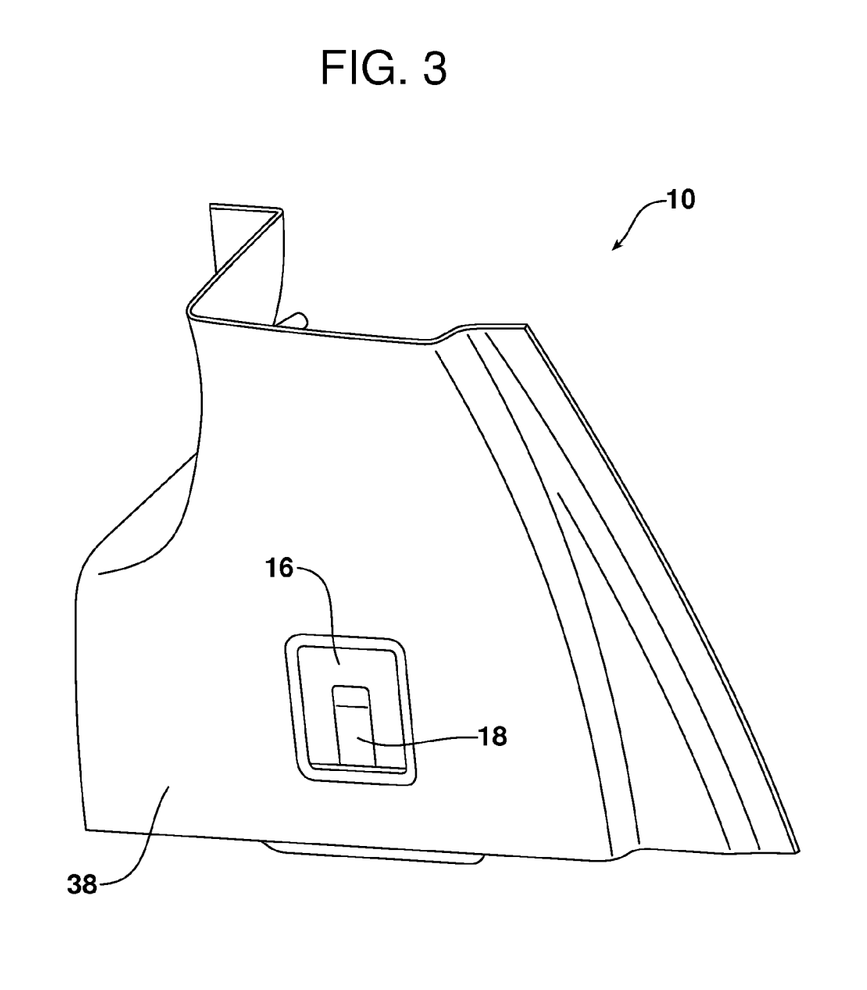
FIG. 3 is a perspective view of the multifunction hook assembly illustrating both pivoting hooks of that assembly in the stowed position.

Reference is now made to FIGS. 3-6 illustrating the assembled multifunction hook assembly 10 in four different operating configurations. As illustrated in FIG. 3, the first pivoting hook 16 and second pivoting hook 18 are both in the stowed position. In this position, the two hooks 16, 18 are held flush with the face of the trim panel 38. Here it should be appreciated that the housing 12 includes an integral stop 42 formed in the recess 14 that is visible in FIGS. 1 and 4. When the first pivoting hook 16 is pivoted into the stowed position, the rear face 44 of that hook (see FIG. 2) rests against the stop 42 thereby positively holding the first hook flush with the face of the trim panel 38 when fully seated in the stowed position.

Figure 4:
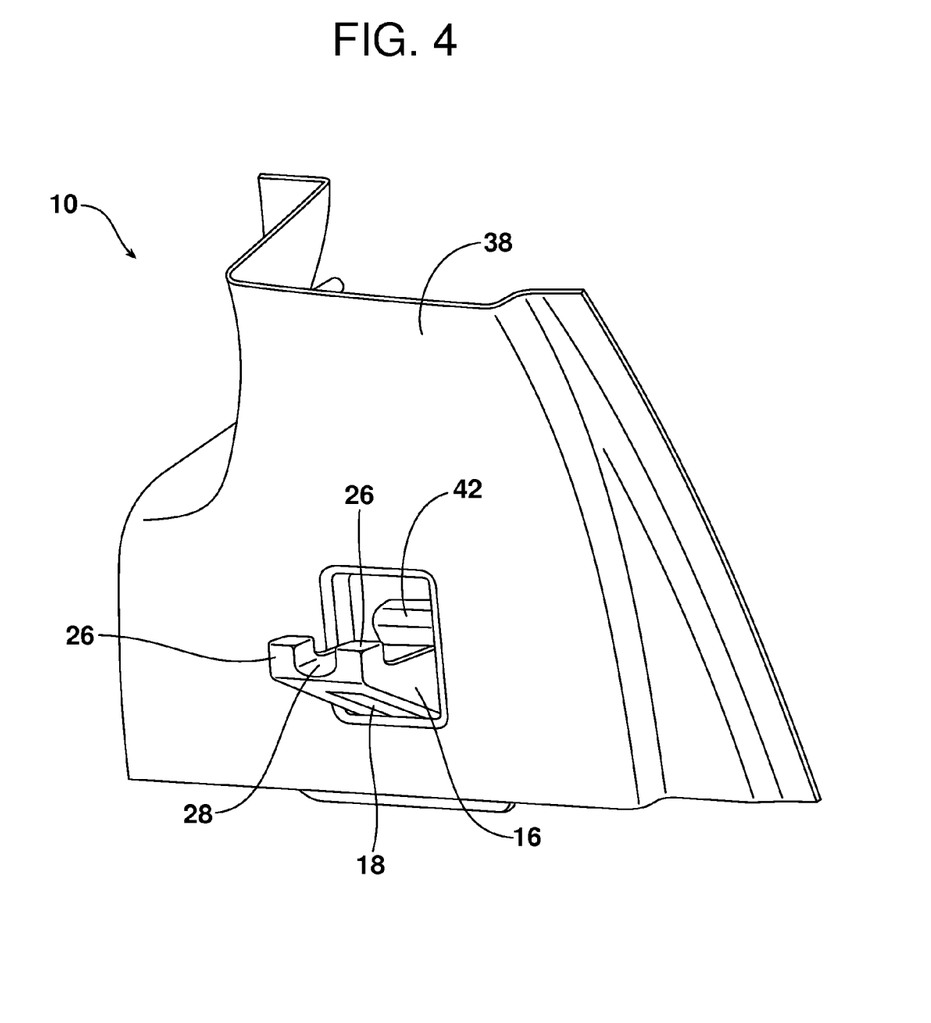
FIG. 4 is a perspective view of the multifunction hook assembly illustrating the first pivoting hook in the deployed position and the second pivoting hook in the stowed position.

Reference is now made to FIG. 4 which illustrates the first pivoting hook 16 in the deployed position while the second pivoting hook 18 remains in the stowed position inside the cavity 30 of the first hook. In this position, the first hook 16 projects outwardly from the face of the trim panel 38 so that it may be easily accessed for use.

Figure 5:
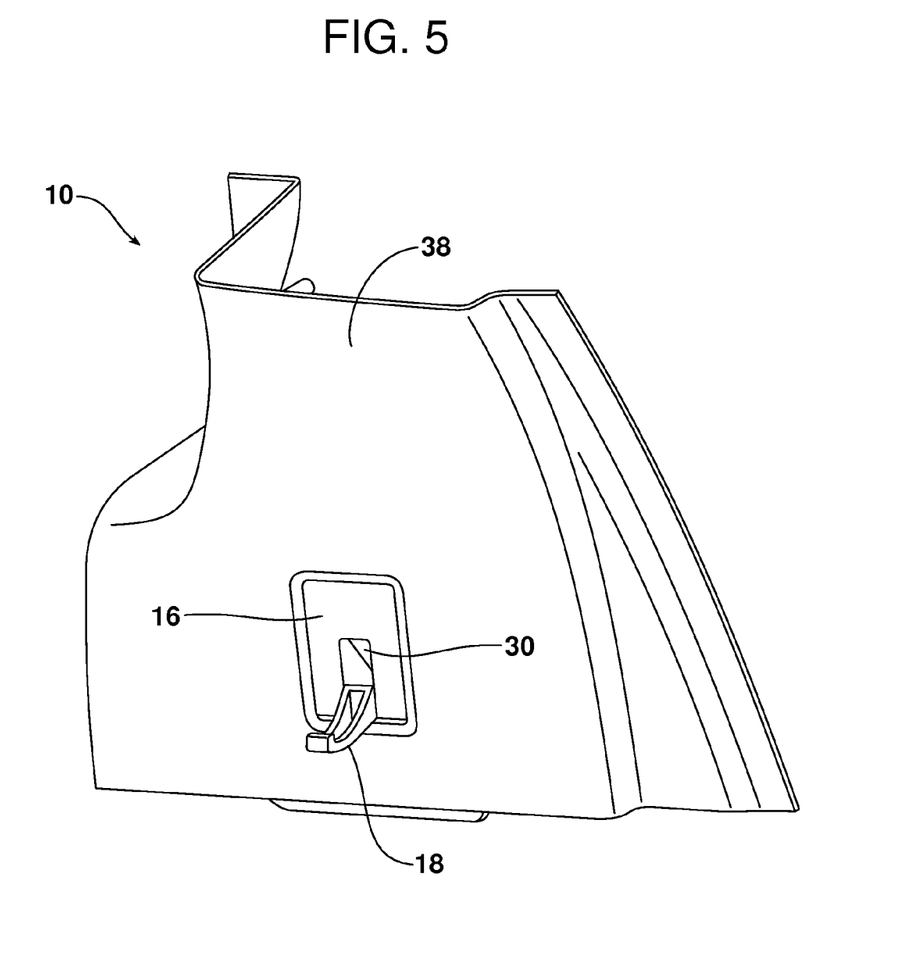
FIG. 5 is a perspective view of the multifunction hook assembly illustrating the first pivoting hook in the stowed position and the second pivoting hook in the deployed position.

Reference is now made to FIG. 5 illustrating yet another configuration wherein the first pivoting hook 16 remains in a stowed position while the second pivoting hook 18 is in the deployed position. In the deployed position, the second pivoting hook 18 projects outwardly from the cavity 30 in the first pivoting hook 16 where it may be easily accessed for use.

Figure 6:
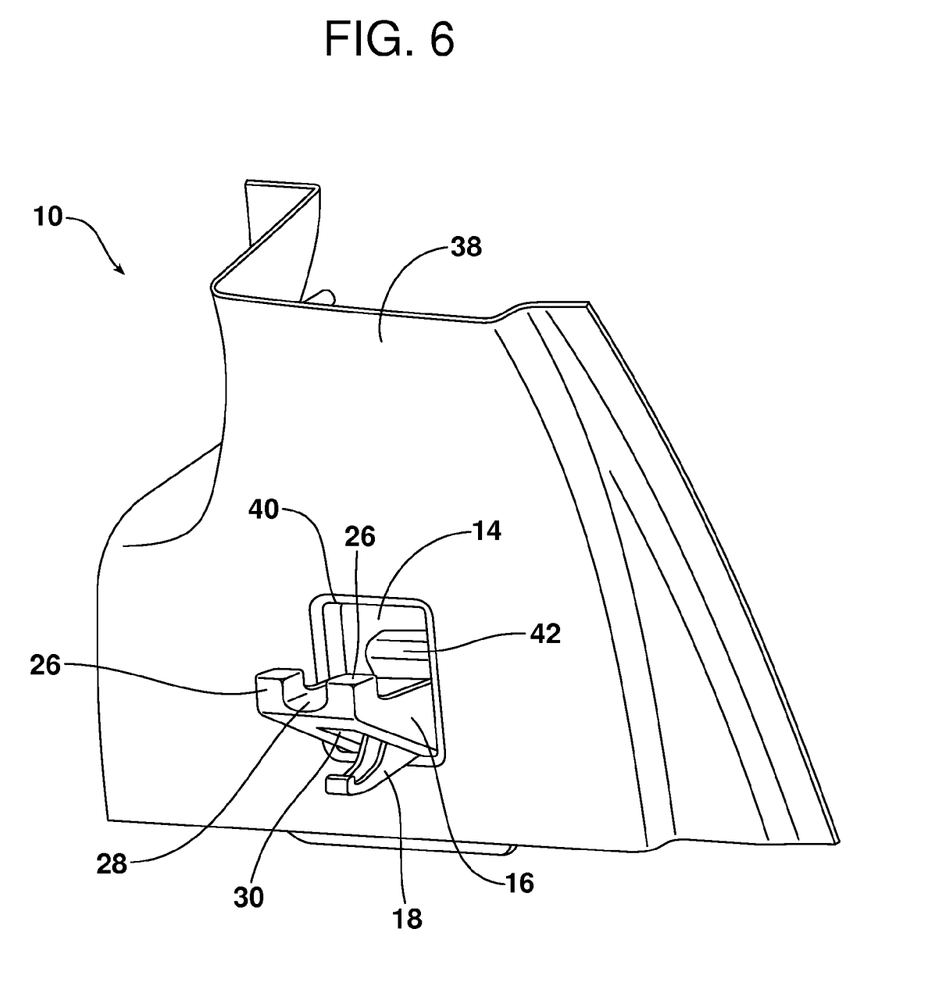
FIG. 6 is a perspective view illustrating the multifunction hook assembly with both of the two pivoting hooks in the deployed position.

Reference is now made to FIG. 6 illustrating both the first pivoting hook 16 and the second pivoting hook 18 in the deployed positions. Thus, the first pivoting hook 16 projects outwardly from the recess 14 in the housing 12 as well as through the opening 40 in the trim panel 38. In addition, the second pivoting hook 18 projects outwardly from the cavity 30 in the first pivoting hook 16. Thus, both pivoting hooks 16, 18 may be easily accessed and used.

As should be appreciated, one may hang the straps of shopping bags, plastic grocery bags or the like on either or both of the deployed pivoting hooks 16, 18 as desired. Advantageously, either or both hooks 16, 18 will hold a bag steady limiting the motion of the bag and any items contained therein during vehicle operation.

Figure 7:
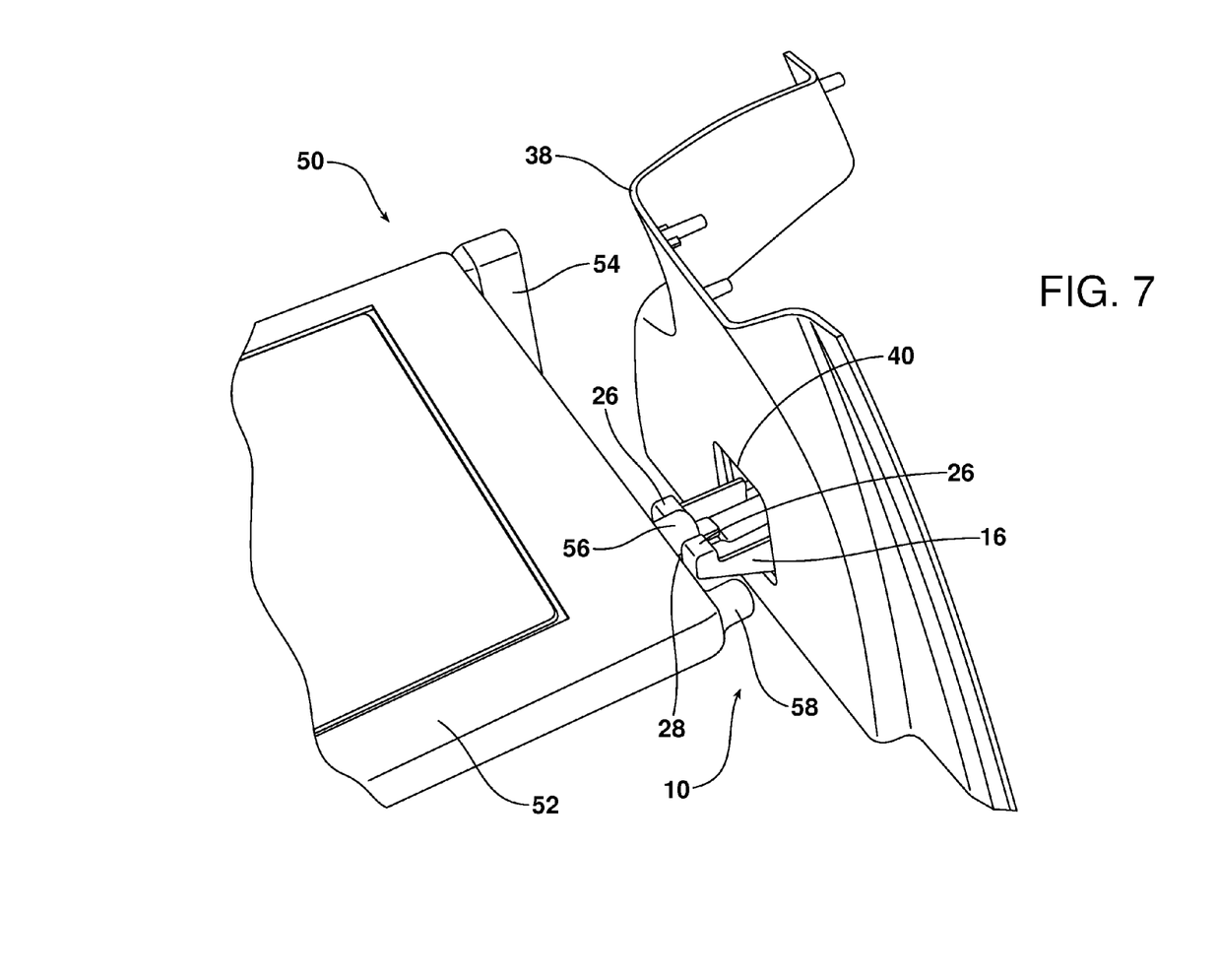
FIG. 7 is a perspective view of one end of a cargo management system incorporating a folding shelf illustrating how the multifunction hook assembly may be utilized to support that shelf in a deployed position.

Reference is now made to FIG. 7 which illustrates an improved cargo management system 50. That cargo management system 50 includes a folding shelf 52 that is held in cantilever fashion by opposed vertical struts 54 at each end thereof (only one illustrated in FIG. 7).

As further illustrated in FIG. 7, the shelf includes a pair of support lugs 56, 58 at each end thereof at a rearward corner of the shelf 52 opposite the strut 54.

When the first pivoting hook 16 is in the deployed position projecting through the opening 40 in the trim panel 38, the notch 28 between the two hook segments 26 is in the proper position to receive and hold one of the support lugs 56. Thus, it should be appreciated that the first pivoting hook 16 functions as a cargo management system support hook. Thus the shelf 52 is supported at each end in a stable, horizontal position by a cooperating strut 54 and the first pivoting hook 16. Here it should be appreciated that the support lug 56 may snap into the notch 28 between the hook segments 26 so as to be firmly held in position.

As should be appreciated, if the second pivoting hook 18 is also deployed, it can be used to hold the straps of a shopping bag or grocery bag even while the first pivoting hook 16 holds the support lug 56 of the shelf 52 in the slot 28.

Figure 8:
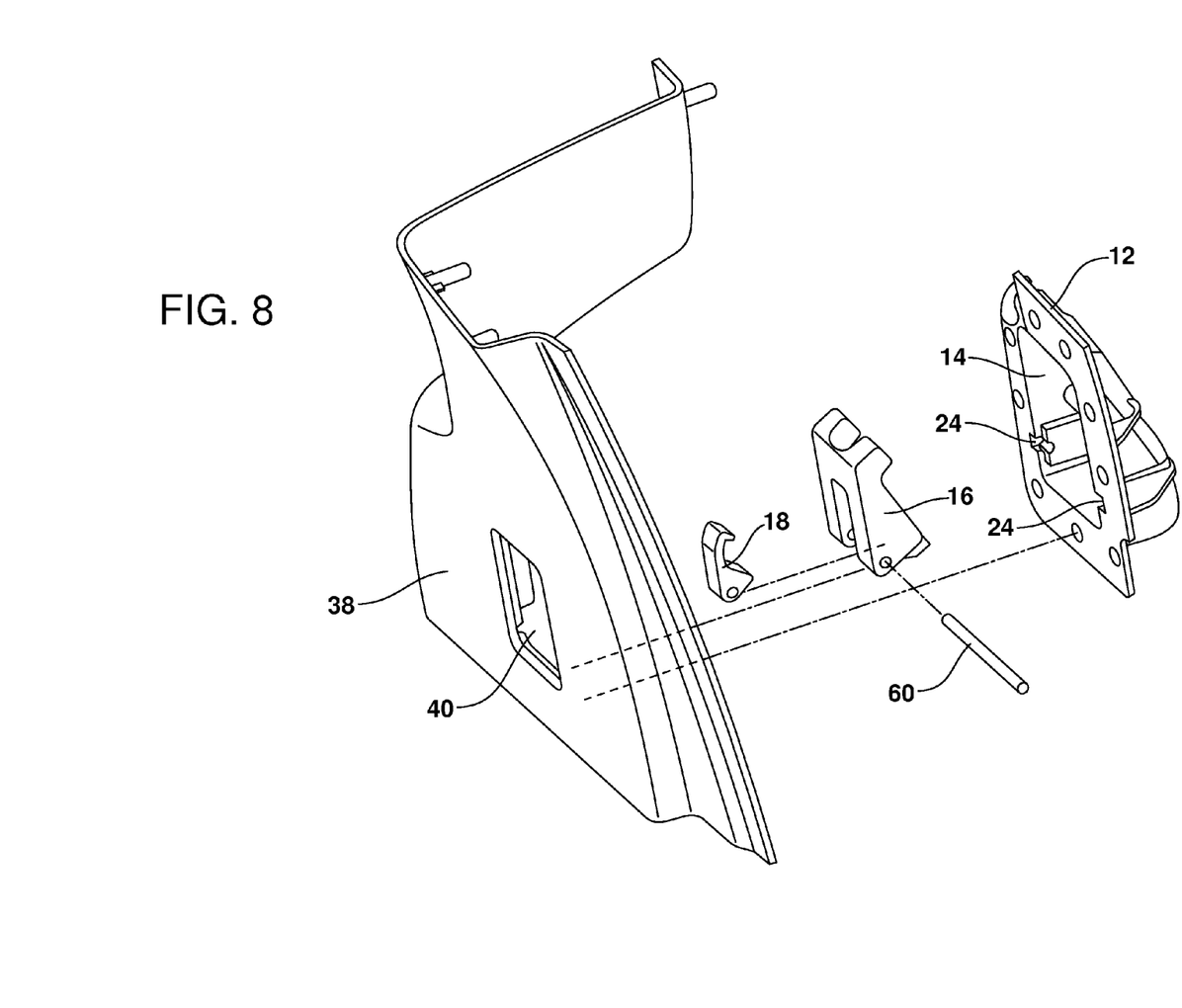
FIG. 8 is a front exploded perspective view illustrating an alternative embodiment of the multifunction hook assembly.

The foregoing has been presented for purposes of illustration and description. It is not intended to be exhaustive or to limit the embodiments to the precise form disclosed. Obvious modifications and variations are possible in light of the above teachings. For example, as illustrated in FIG. 8, a multifunction hook assembly 10 may be provided with a single pivot pin 60 for pivotally mounting the first hook 16 and the second hook 18 to the housing 12. Here it should be appreciated that the ends of the pivot pin 60 are captured in the opposed pivot pin receivers 24 by the trim face 38. All such modifications and variations are within the scope of the appended claims when interpreted in accordance with the breadth to which they are fairly, legally and equitably entitled.

What is claimed:

1. A multifunction hook assembly for a motor vehicle, comprising:
a housing including a recess;
a first pivoting hook carried on said housing, said first pivoting hook having a cavity formed within a front face of said first pivoting hook; and
a second pivoting hook carried on said housing wherein said first pivoting hook and said second pivoting hook are displaceable between stowed positions received within said recess and deployed positions projecting from said recess, wherein said second pivoting hook is received within the cavity when in said stowed position.

2. The multifunction hook assembly set forth in claim 1, including a first pivot connecting said first pivoting hook to said housing.

3. The multifunction hook assembly set forth in claim 2, including a second pivot connecting said second pivoting hook to said first pivoting hook.

4. The multifunction hook assembly set forth in claim 3, further including a trim panel having an opening overlying said recess in said housing.

5. The multifunction hook assembly set forth in claim 3, wherein said first pivot includes a first set of opposed pivot pins connecting said first pivoting hook to said housing.

6. The multifunction hook assembly set forth in claim 5, wherein said first pivoting hook includes two hook segments separated by a notch.

7. The multifunction hook assembly set forth in claim 6, wherein said two hook segments are aligned.

8. The multifunction hook assembly set forth in claim 7, wherein said housing includes an integral stop in said recess for holding said first pivoting hook flush with said trim face when said first pivoting hook is in said stowed position.

9. The multifunction hook assembly set forth in claim 1, further including a trim panel having an opening overlying said recess in said housing.

10. The multifunction hook assembly set forth in claim 1, wherein said first pivoting hook includes two hook segments separated by a notch.

11. The multifunction hook assembly set forth in claim 10, wherein said two hook segments are aligned.

12. The multifunction hook assembly set forth in claim 11, wherein said housing includes an integral stop in said recess for holding said first pivoting hook flush with said trim face when said first pivoting hook is in said stowed position.

13. The multifunction hook assembly set forth in claim 1, wherein said housing includes an integral stop in said recess for holding said first pivoting hook flush with said trim face when said first pivoting hook is in said stowed position.

14. In a cargo management system for a motor vehicle including a folding shelf, the improvement comprising a multifunction hook assembly including:
   a housing including a recess;
   a first pivoting hook carried on said housing; and
   a second pivoting hook carried on said housing wherein said first pivoting hook and said second pivoting hook are displaceable between stowed positions received within said recess and deployed positions projecting from said recess, wherein said first pivoting hook includes a cavity formed within a front face of said first pivoting hook and said second pivoting hook is received within said cavity when in said stowed position.

15. The cargo management system of claim 14, including a first pivot connecting said first pivoting hook to said housing.

16. The cargo management system of claim 15, including a second pivot connecting said second pivoting hook to said first pivoting hook.

17. The cargo management system of claim 16, further including a trim panel having an opening overlying said recess in said housing.

18. A multifunction hook assembly for a motor vehicle, comprising:
   a housing including a recess;
   a first pivoting hook carried on said housing;
   a first pivot connecting said first pivoting hook to said housing, wherein said first pivot includes a first set of opposed pivot pins connecting said first pivoting hook to said housing;
   a second pivoting hook carried on said housing, wherein said first pivoting hook and said second pivoting hook are displaceable between stowed positions received within said recess and deployed positions projecting from said recess, and wherein said first pivoting hook includes a cavity and said second pivoting hook is received within said cavity when in said stowed position; and
   a second pivot connecting said second pivoting hook to said first pivoting hook, wherein said second pivot includes a second set of opposed pivot pins connecting said second pivoting hook to said first pivoting hook.

* * * * *